United States Patent

[11] 3,571,863

| [72] | Inventor | Maurus C. Logan |
| | | Elizabeth, N.J. |
| [21] | Appl. No. | 816,672 |
| [22] | Filed | Apr. 16, 1969 |
| [45] | Patented | Mar. 23, 1971 |
| [73] | Assignee | Thomas & Betts Corporation |
| | | Elizabeth, N.J. |

[54] WIRE FORM FOR BUNDLING WIRES
2 Claims, 11 Drawing Figs.

[52] U.S. Cl. ..................................................... 24/123,
24/16, 24/131, 174/72, 248/68
[51] Int. Cl. ..........................................A44b 21/00,
H02g 3/00
[50] Field of Search........................................... 174/72 (A);
248/49, 68; 24/81.3, 81 (C); 281/25 (A); 317/122;
24/123 (W), 16, 131

[56] References Cited
UNITED STATES PATENTS

| 2,112,389 | 3/1938 | Trussell | 281/25 |
| 2,941,027 | 6/1960 | Svec | 174/72 |
| 3,024,301 | 3/1962 | Walch | 248/49X |
| 3,082,984 | 3/1963 | Larsson et al. | 174/72X |

Primary Examiner—Theron E. Condon
Assistant Examiner—Neil Abrams
Attorney—David Teschner ABSTRACT: A means and a method for bundling together a plurality of cylindrical members wherein a preformed continuous wire-supporting member of generally open trough shape is caused to embrace a bundle of cylindrical members by urging together the sides of the supporting member. A protective layer may also be included within or without the supporting member to provide environment protection for the cylindrical members within. Alternatively, a separate member may be employed to complete the enclosure of the cylindrical members without urging together the sides of the supporting member.

PATENTED MAR 23 1971

INVENTOR.
MAURUS C. LOGAN
by David Teselin

ATTORNEY

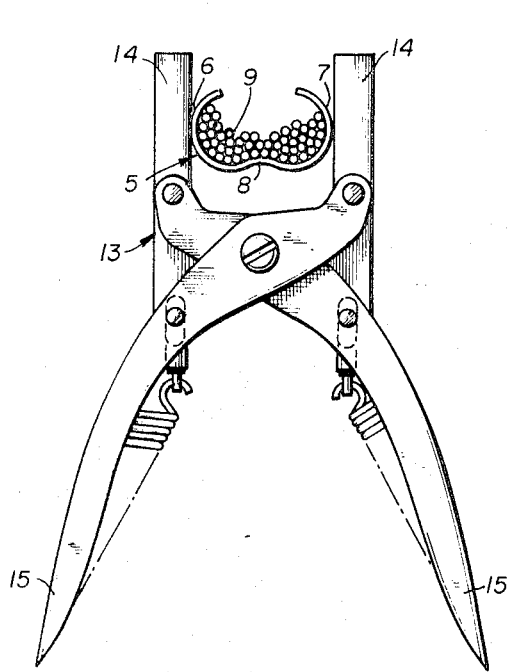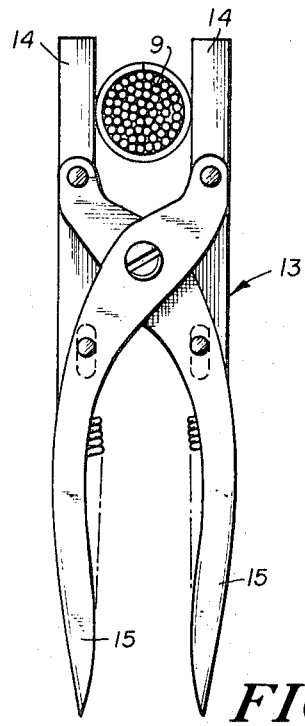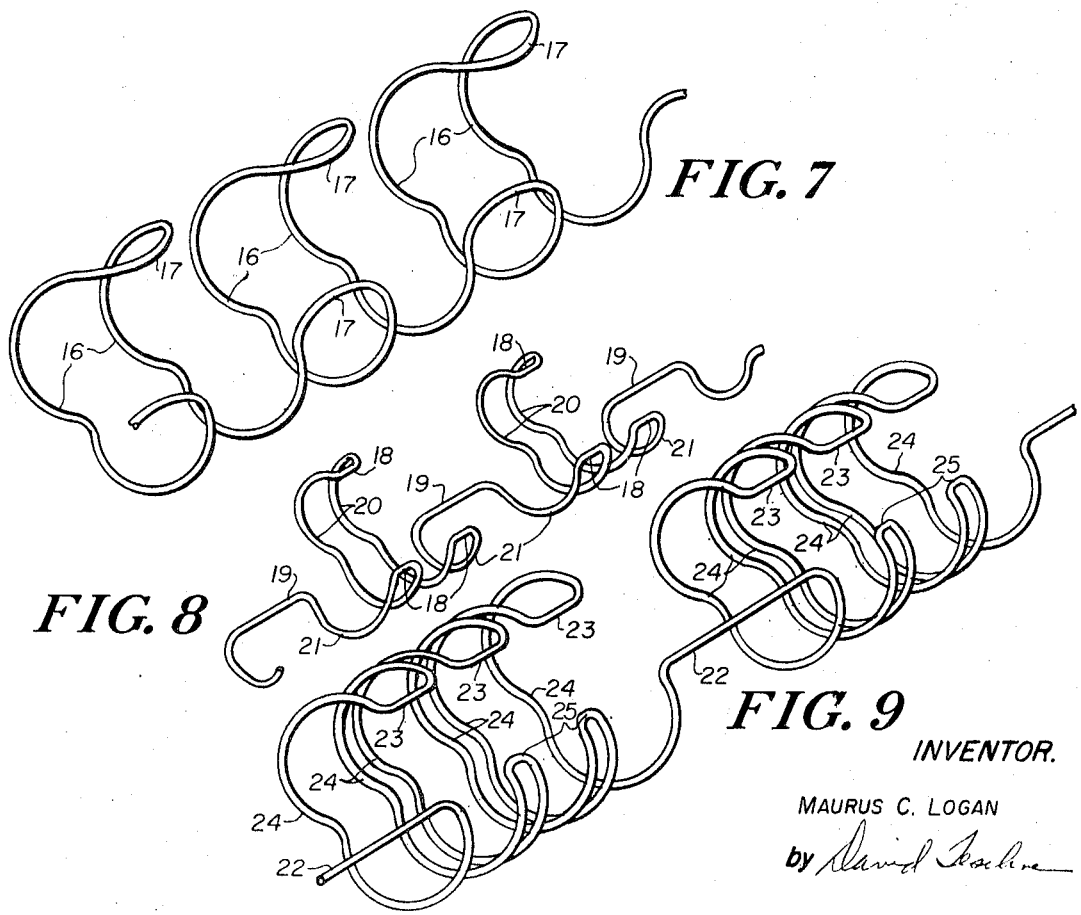

WIRE FORM FOR BUNDLING WIRES

This invention relates generally to a wire form for bundling cylindrical members and more specifically to a preshaped wire form of an elongated open trough configuration which is adapted to receive a bundle of electrical wires and to support and closely contain them by squeezing the sides together into a cylindrical form or by applying a cover member.

In complex electrical equipment it is usual practice to group together individual wires running from one subunit to another into a common bundle or cable. In this way the equipment presents a much neater appearance and the likelihood of damage to individual wires is considerably decreased. Furthermore it is possible to precut and preassemble the wires interconnecting various terminal points into a cable bundle or wiring harness prior to making connections to individual terminals.

In order to obtain the maximum benefit from the above-mentioned advantages of bundling it is desirable that the bundling means be inexpensive both in material cost and in labor needed to apply it. Bundling is frequently accomplished by lacing with cord or tying at intervals with cord or one of the many plastic or metal bundling straps currently available. These methods involve a high labor cost because the operator must be experienced and skilled at wrapping in a uniform manner at a rapid rate. Moreover, cord lacing or individual bundling straps provide no structural support to the wiring harness other than that inherent in the bundle of wires itself. Consequently, the bundle tends to flex and ultimately fray and break the wrapping cord.

In contrast, the invention disclosed herein provides firm support to the harness and simultaneously closely wraps around the wires to produce a firmly packed cylindrical bundle. At the same time, the wire comprising the bundling form is sufficiently flexible to permit bending the harness to conform to any desired shape as dictated by the equipment in which it is used; yet it is stiff enough to hold the bundle in that shape. Further, by use of a proper jig or template, together with a hand- or power-operated squeezing tool, an inexperienced operator is enabled to lay out a complex wiring harness and bundle it rapidly and uniformly. For nontool operations a separate cover member can be snapped into place to complete the bundle. By the use of inserts or external covers which conform to the supporting member and are deformed along with the supporting member it is possible to provide environmental protection for the wires within.

Accordingly, it is an overall object of this invention to provide a simple and inexpensive means for grouping or bundling a plurality of cylindrical members.

A further object of this invention is to provide a one-piece bundling member that simultaneously supports and embraces the members bundled thereby.

A still further object of this invention is to provide a bundling member which does not require any tying or lacing by the operator.

It is yet another object to provide a two-piece bundling unit which can be applied to a plurality of wires without the use of tools.

It is another object to provide a bundling unit which in addition to supporting and embracing the cylindrical members bundled thereby to provide environmental protection therefore.

These and other objects, advantages and features of the invention will become more apparent from the following description taken in conjunction with the accompanying drawings wherein:

FIG. 4 is an end view of a wire bundle with a hand-operated tool in place for squeezing the bundling means around the wires;

FIG. 5 is an end view similar to FIG. 4 showing the bundle after the bundling means has been squeezed around the wires;

FIG. 7 is a perspective view of an alternate form of wire-bundling member;

FIG. 8 is a perspective view of another alternate form of wire-bundling member;

FIG. 9 is a perspective view of still another alternate form of wire-bundling member;

Figure 1:
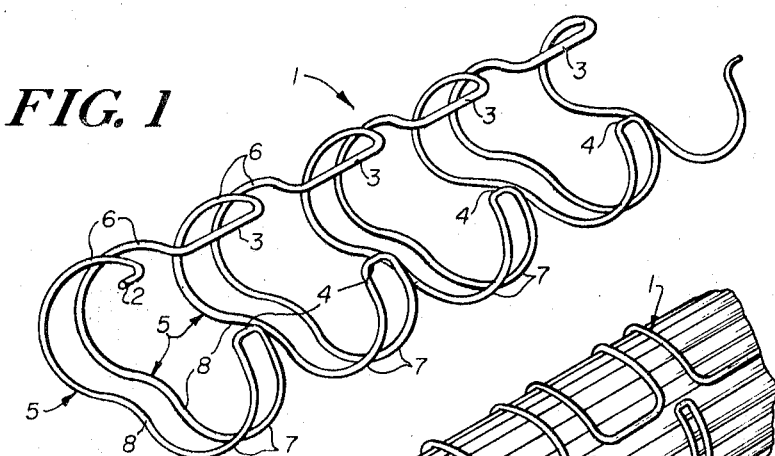
FIG. 1 is a perspective view of the preformed wire-bundling member.

Referring to the drawings, the wire form bundling member, indicated generally by the numeral 1, consists of a continuous preformed wire 2, preferably of plastic-coated steel although other materials may be substituted. Steel wire provides maximum strength and stiffness for its size, at low cost. The plastic coating provides electrical insulation, guards against rust, and reduces the likelihood of biting into the insulation of the bundled wires and causing possible electrical shorts.

The continuous wire 2 is formed into a series of longitudinally extending sections 3 and 4 which are connected by curved transverse sections 5 disposed generally perpendicularly to the longitudinal axis defined by sections 3 and 4. In the embodiment of FIG. 1, the sections 3 are longer than the sections 4 so that longitudinal spacing of the transverse sections 5 is not uniform. Curved sections 5 are preferably formed with two arcuate outer portions 6 and 7, which comprise arcs of two intersecting circles of equal radius, portions 6 and 7 being joined by reversely curved portion 8. The described form is merely illustrative, and my invention is not limited to the embodiment of FIG. 1, as will presently be described.

The particular form shown in FIG. 1 is similar to the wire form disclosed by Trussell in U.S. Pat. No. 2,116,589 to be used for the binding of notebooks and the like. My invention provides a totally new and unexpected application for such a form, namely the firm bundling and support of groups of cylindrical members such as electrical conductors.

Figure 2:
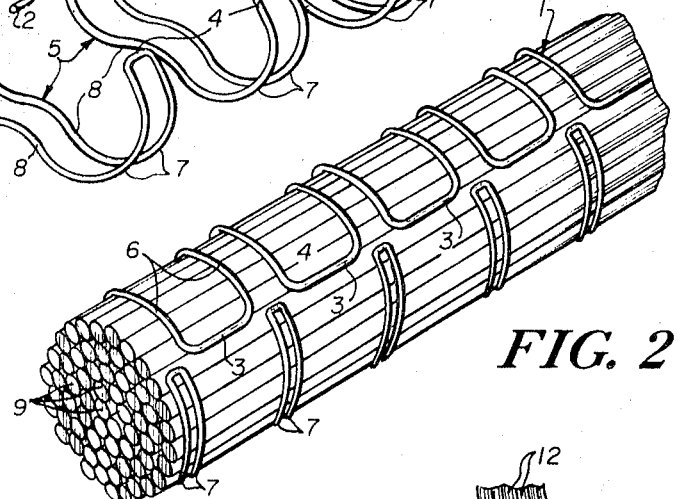
FIG. 2 is a perspective view of a plurality of wires secured by the bundling means.
Figure 3:
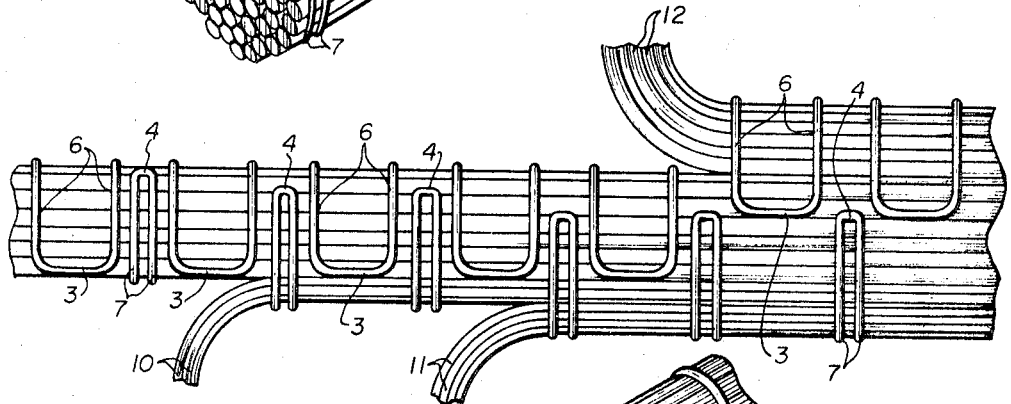
FIG. 3 is a side elevation view of a bundle of wires secured by the bundling means with wires branching to different terminal points.

In using the wire form for this purpose, a group of wires 9 is placed in the wire form 1 (FIG. 4) with the ends of the wires being led out between the transverse sections 5 at desired locations 10, 11 and 12 (FIG. 3). A hand-operated tool 13 having parallel flat jaws 14 is applied to the outer portions 6 and 7 of curved sections 5. The handles 15 are squeezed together until curved sections 5 firmly embrace the group of wires. In the process of closing about wire bundle 9 as the result of the urging by parallel flat jaws 14, the initial double-arc shape of sections 5 becomes substantially circular, as shown in FIGS. 2 and 5.

FIG. 3 depicts the application of wire form 1 to a group of wires wherein individual wires or groups thereof are led out to different terminal points. It is preferred that a size of wire form be chosen such that for a given number and size of conductors the longitudinally extending sections forming one edge of the trough will be substantially aligned in the gaps between the alternate sections forming the opposite edge when embracing the wire bundle, as shown in FIG. 2, so that no wires can slip out of the bundle. It is possible, however, for a given size form to accommodate a wide variation in bundle size, as indicated in FIG. 3, by permitting the opposed edge-forming longitudinally extending sections 3 and 4 to overlap each other.

Figure 6:
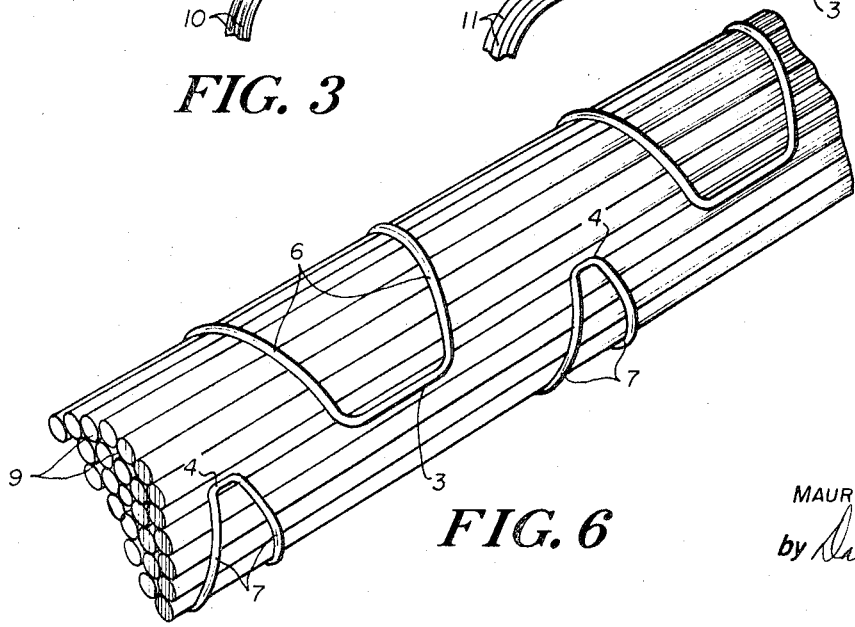
FIG. 6 is a perspective view of a plurality of wires secured by the bundling means which has been axially stretched from its preformed shape.

FIG. 6 illustrates a "stretched" version of the basic wire form of FIG. 1. I have found that in some relatively long cable runs and where reduced wrapping tightness and axial support stiffness can be tolerated the wire form can be stretched axially to approximately three times its initial length and still provide effective bundling support. Stretching the wire form represents considerable savings in bundling cost per lineal foot, both in material and labor. In addition, a few stock lengths of wire forms can, through stretching, be adjusted to fit any desired length of cable harness. Alternatively, the wire form can be selectively stretched so that the transverse sections remain closely spaced in the vicinity of termination points where firmer wrapping support is desired and are stretched apart in the intermediate runs between terminals.

It is apparent that there is no need for the curved portions to be parallel when using the wire form of Trussell U.S. Pat. No. 2,116,589 for bundling wires although they must be so when used for binding books in order for the pages to turn freely. It is advantageous to fabricate the curved portions parallel, however, in order to produce a form having minimum length for shipment and storage purposes but having maximum capacity for stretching.

Alternate shapes of the wire form are shown in FIGS. 7, 8 and 9. In FIG. 7, curved transverse sections 16 are joined at each end by longitudinally extending sections 17 which define alternate side edges of a generally elongated trough-shaped form. In this embodiment, sections 17 are all of equal length.

FIG. 8 comprises groups of transverse sections longitudinally spaced by the relatively long straight sections 19 which define a central spine of the trough-shaped form. Each group consists of a pair of double-arc curved transverse sections 20 flanked by a pair of single-arc transverse sections 21, all joined by relatively short longitudinally extending sections 18 which alternately define opposite side edges of the trough. Since the single-arc transverse sections 21 are about one-half the length of the double-arc transverse sections 20, they terminate near the center of the trough-shaped form where they join the above-mentioned relatively long straight sections 19. A third alternative form is depicted in FIG. 9 where relatively long straight sections 22 serve to interruptedly define one side edge of a trough-shaped form. Sections 22 are connected at each end to groups of curved transverse sections 24. Each group consists of six transverse sections 24 joined by relatively short longitudinally extending sections 23 alternating with very short longitudinally extending sections 25.

None of the three alternative forms of FIGS. 7, 8 and 9 could be used to bind the pages of a book in the manner disclosed by Trussell U.S. Pat. No. 2,116,589, yet each presents advantages in certain wire-bundling applications. For example, the form of FIG. 7 provides the most uniform wrapping support per unit length of fabricated wire form and also is economical in its use of wire. The center spine of the trough defined by sections 19 in FIG. 8 is useful where it is desired to attach the form to a rigid surface, as by staples, prior to laying in the group of wires and closing the curved sections 20 and 21. The form of FIG. 9 utilizes more wire in its fabrication but consequently permits a larger degree of axial stretch than the other illustrated forms.

Figure 10:
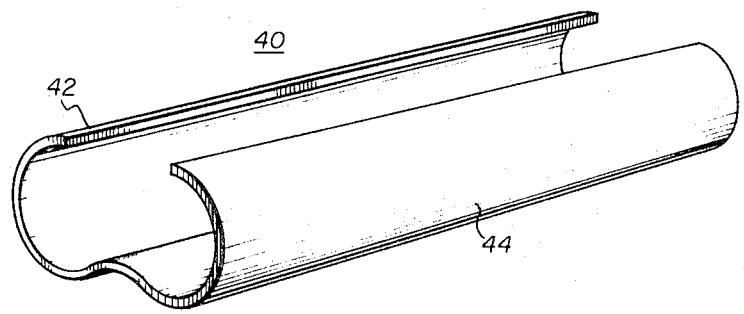
FIG. 10 is a perspective view of an environmental member to be employed with the bundling means of the instant invention.

Turning now to FIG. 10 there is shown a protective member 40 which can be used to provide environmental protection to the wires placed within one of the bundling members heretofore described. The general surface contour of protective member 40 conforms to that of the bundling member and when placed therein is held by, for example, the curved portions 6 and 7 of FIG. 1. Similarly, curved portions 42 and 44 may be placed about the outer surfaces of curved portions 6 and 7. In either case, protective member 40 will deform with the bundling member as the same is closed about the wires to be bundled. Protective member 40 may be made of rubber, plastic or metal or other suitable material. For example, protective member 40 may be extruded of a suitable plastic material to provide environmental protection, or it may be formed from metal foil to provide a shield against radio frequency interference or magnetic fields.

Figure 11:
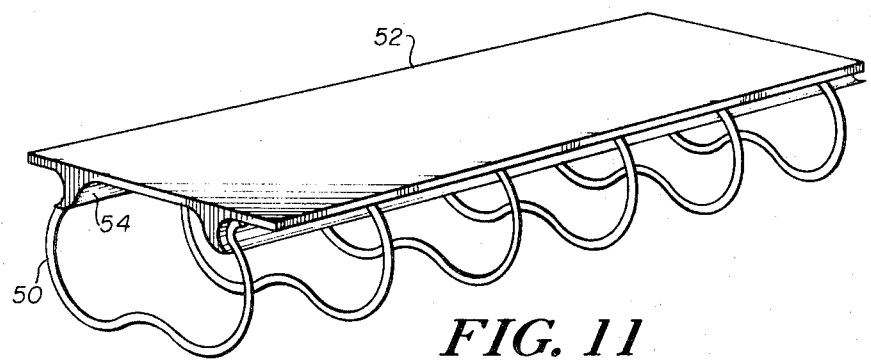
FIG. 11 is a perspective view of a further alternate form of wire-bundling member.

FIG. 11 shows an alternate form in which a cover 52 may be employed to complete the bundling member 50 without the necessity for tools to squeeze the bundling member 50 closed. Cover 52 has lips 54 formed as reversed arcs complementary to the curved portions of the bundling member 50. After the wires have been placed in the bundling member 50, the cover 52 is placed upon the open portion of the bundling member 50. The tips of the lips 54 spread the sides of the bundling member 50 until they pass further into bundling member 50 at which time the curved portions return to their original position retaining cover 52. Cover 52 may be removed by pulling up thereon.

While the disclosure hereinbefore set forth represents preferred embodiments, it will be appreciated that other modifications and variations may be made without departing from the spirit and scope thereof, and therefore only such limitations should be imposed as are indicated in the appended claims.

I claim:

1. An elongated supporting device for use in bundling together a plurality of cylindrical members which comprises a continuous flexible strip bent at intervals to form a plurality of longitudinally extending sections of various lengths alternating with a plurality of curved transverse sections, said transverse sections defining, in conjunction with said longitudinally extending sections, a trough for receiving said cylindrical members, and the transverse sections being bendable to close the trough about the cylindrical members; said transverse sections being of different lengths, whereby certain of said longitudinally extending sections define edges of said trough and other of said longitudinally extending sections define a central spine of said trough.

2. An elongated supporting device for use in bundling together a plurality of cylindrical members which comprises a continuous flexible strip bent at intervals to form a plurality of longitudinally extending sections of equal lengths alternating with a plurality of curved transverse sections, said transverse sections defining, in conjunction with said longitudinally extending sections, a trough for receiving said cylindrical members, and the transverse sections being bendable to close the trough about the cylindrical members; said transverse sections being of different lengths, whereby certain of said longitudinally extending sections define edges of said trough and other of said longitudinally extending sections define a central spine of said trough.